(12) United States Patent
Hu

(10) Patent No.: US 11,074,083 B2
(45) Date of Patent: Jul. 27, 2021

(54) FAST LOADING KERNEL IMAGE FILE FOR BOOTING

(71) Applicant: HUAWEI TECHNOLOGIES CO., LTD., Guangdong (CN)

(72) Inventor: Huifeng Hu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 16/387,341

(22) Filed: Apr. 17, 2019

(65) Prior Publication Data

US 2019/0243663 A1 Aug. 8, 2019

Related U.S. Application Data

(63) Continuation of application No. PCT/CN2017/106554, filed on Oct. 17, 2017.

(30) Foreign Application Priority Data

Oct. 19, 2016 (CN) .......................... 201610912248.4

(51) Int. Cl.
*G06F 9/44* (2018.01)
*G06F 9/4401* (2018.01)
(Continued)

(52) U.S. Cl.
CPC .......... *G06F 9/4405* (2013.01); *G06F 3/0608* (2013.01); *G06F 9/50* (2013.01); *G06F 21/51* (2013.01); *H03M 7/6005* (2013.01)

(58) Field of Classification Search
CPC .................................................. G06F 9/4405
See application file for complete search history.

(56) References Cited

U.S. PATENT DOCUMENTS 6,446,238 B1 * 9/2002 Canestaro ........... G06F 11/1004
714/800
6,941,403 B2 * 9/2005 Cedar .................... G06F 13/385
710/301

(Continued)

FOREIGN PATENT DOCUMENTS

CN          1818869 A      8/2006
CN        102236543 A     11/2011
(Continued)

OTHER PUBLICATIONS

PCT International Search Report and Written Opinion issued in International Application No. PCT/CN2017/106554 dated Jan. 16, 2018, 16 pages (with English translation).

(Continued)

*Primary Examiner* — Benjamin C Wu
(74) *Attorney, Agent, or Firm* — Fish & Richardson P.C.

(57) ABSTRACT

Example methods and apparatus for fast loading a kernel image file are provided. A multi-core processor includes a first core group and a second core group. The second core group includes a plurality of cores. In one example method, the first core group obtains a plurality of data blocks in a compressed kernel image file from a nonvolatile storage, and checks the currently obtained current data block. The current data block is put into a decompression queue in response to determining that the data block is correct. At least two of the plurality of cores in the second core group obtain the data block from the decompression queue, and after obtaining a plurality of data blocks, decompress the plurality of obtained data blocks into a memory in parallel to obtain the kernel image file.

19 Claims, 5 Drawing Sheets

(51) Int. Cl.
*G06F 3/06* (2006.01)
*H03M 7/30* (2006.01)
*G06F 21/51* (2013.01)
*G06F 9/50* (2006.01)

(56) References Cited

U.S. PATENT DOCUMENTS

| | | | | |
|---|---|---|---|---|
| 6,965,989 | B1* | 11/2005 | Strange | G06F 1/24 |
| | | | | 709/220 |
| 7,549,042 | B2* | 6/2009 | Glaum | G06F 11/1433 |
| | | | | 713/100 |
| 9,779,240 | B2* | 10/2017 | Feroz | G06F 21/566 |
| 2004/0064457 | A1 | 4/2004 | Zimmer et al. | |
| 2010/0325523 | A1* | 12/2010 | Slyz | G06F 11/1433 |
| | | | | 714/773 |
| 2011/0099544 | A1* | 4/2011 | Haramiishi | G06F 8/654 |
| | | | | 717/168 |
| 2013/0125107 | A1* | 5/2013 | Bandakka | G06F 11/1448 |
| | | | | 717/171 |
| 2015/0106609 | A1 | 4/2015 | Koszek | |
| 2015/0110202 | A1* | 4/2015 | Tucker | H04N 19/85 |
| | | | | 375/240.26 |
| 2015/0381203 | A1* | 12/2015 | Master | H03M 7/42 |
| | | | | 341/67 |
| 2016/0077871 | A1* | 3/2016 | Kaplan | G06F 1/3246 |
| | | | | 718/102 |
| 2016/0117221 | A1* | 4/2016 | Nair | G06F 11/108 |
| | | | | 714/764 |
| 2016/0149669 | A1* | 5/2016 | Meyers | H04L 1/0073 |
| | | | | 714/750 |
| 2016/0350171 | A1* | 12/2016 | Resch | G06F 3/0619 |
| 2017/0039075 | A1 | 2/2017 | Li et al. | |
| 2017/0161148 | A1* | 6/2017 | Vairavanathan | G06F 11/1076 |
| 2019/0310859 | A1* | 10/2019 | Kopfstedt | G06F 3/0661 |

FOREIGN PATENT DOCUMENTS

| | | |
|---|---|---|
| CN | 102244518 A | 11/2011 |
| CN | 103077043 A | 5/2013 |
| CN | 103384884 A | 11/2013 |
| CN | 103455345 A | 12/2013 |
| CN | 103970557 A | 8/2014 |
| CN | 104156659 A | 11/2014 |
| CN | 104750492 A | 7/2015 |
| CN | 105117246 A | 12/2015 |
| EP | 2487583 A1 | 8/2012 |
| WO | 2015200760 A1 | 12/2015 |

OTHER PUBLICATIONS

Office Action issued in Chinese Application No. 201610912248.4 dated Jun. 19, 2020, 7 pages.
Collet [online], "LZ4 Frame Format Description," XP055614349, Feb. 13, 2016, 8 pages.
Extended European Search Report issued in European Application No. 17862572.9 dated Sep. 2, 2019, 14 pages.
Sitaridi et al., "Massively-Parallel Lossless Data Decompression," 2016 45th International Conference on Parallel Processing (ICPP), IEEE, Aug. 16, 2016, XP032969651, pp. 242-247.
ARM, "ARM Cortex-A Series, Version: 4.0," Programmers Guide, XP055598633, 2013, 422 pages.
EPO Communication pursuant to Article 94(3) EPC issued in European Application No. 17862572.9 dated May 17, 2021, 5 pages.

* cited by examiner

FAST LOADING KERNEL IMAGE FILE FOR BOOTING

CROSS-REFERENCE TO RELATED APPLICATIONS

This application is a continuation of International Application No. PCT/CN2017/106554, filed on Oct. 17, 2017, which claims priority to Chinese Patent 201610912248.4, filed on Oct. 19, 2016. The disclosures of the aforementioned applications are hereby incorporated by reference in their entireties.

TECHNICAL FIELD

The present disclosure relates to the field of computer technologies, and in particular, to a method and an apparatus for fast loading a kernel image file.

BACKGROUND

To start up various electronic devices and communications devices such as an intelligent terminal (such as a mobile phone, a tablet, or a smartwatch), a set top box, an embedded device, and a server on which operating systems are running, a kernel (kernel) image file usually needs to be loaded from a nonvolatile storage to a memory by using a boot program (boot program), and then the boot program starts a kernel based on the kernel image file.

Referring to FIG. 1, FIG. 1 is a schematic diagram of loading a kernel image file in the prior art. Regardless of whether a device is based on a multi-core processor or a single-core processor, a boot process is performed by one core in the processor. The core first reads an entire compressed kernel image file from a nonvolatile storage (for example, a disk or a flash memory), and then checks (for example, perform a check and calculation by using a CRC) the entire file to determine whether the read file is correct. If the read file is correct, a decompression operation is performed to obtain a decompressed kernel image file, and the decompressed kernel image file is stored in the memory.

In the foregoing solution, there is a problem that it takes an excessively long time to load a kernel image file, resulting in an excessively long startup time of the entire device, and affecting user experience.

SUMMARY

Embodiments of the present disclosure provide a method for fast loading a kernel image file, so as to resolve a prior-art problem that an excessively long loading time results in an excessively long startup time of an entire device and affects user experience.

According to a first aspect, an embodiment of the present disclosure provides a method for fast loading a kernel image file, and the method is executed by a multi-core processor, where the multi-core processor is connected to a nonvolatile storage and a memory, the multi-core processor includes a first core group and a second core group, the first core group includes at least one core, the second core group includes a plurality of cores, and the method includes:

obtaining, by the first core group, a plurality of data blocks in a compressed kernel image file from the nonvolatile storage, where the compressed kernel image file includes a plurality of data blocks obtained after block compression is performed on the kernel image file;

checking, by the first core group each time obtaining a data block, the currently obtained current data block, and when it is checked that the data block is correct, putting, by the first core group, the current data block into a decompression queue; and obtaining, by at least two of the plurality of cores in the second core group when there is a data block in the decompression queue, the data block in the decompression queue, and decompressing data blocks into the memory in parallel to finally obtain the kernel image file.

In the method provided in the first aspect, the one or more cores in the first core group are configured to: obtain the kernel image file and perform a check and calculation. The plurality of cores in the second core group are configured to perform decompression. A person skilled in the art may understand that the first core group continuously obtains data blocks, checks the data blocks, and then outputs the data blocks to the second core group for decompression. A pipeline operating manner is formed, a degree of parallelism is increased, and a processing speed can be improved.

It should be noted that a core in the first core group and a core in the second core group are grouped from a perspective of functions. When different functions are executed, a core originally in one core group may be switched to another core group. For example, a core A is originally configured to obtain a data block. In this case, the core A belongs to the first core group. Subsequently, after obtaining all the data blocks, the core A completes the data block obtaining function and is reused to perform decompression. In this case, the core A belongs to the second core group.

In the first aspect, performing block compression and a check on the kernel image file belongs to the prior art. For example, compression may be performed by using an algorithm such as LZO or LZ4. A cyclic redundancy check (CRC) method may be used for a check. Details are not described herein.

In the first aspect, the person skilled in the art may understand that, to speed up processing, each core completes its own task (for example, tasks such as obtaining a block, checking, obtaining data in a decompression queue, and decompressing) "as quickly as possible". The person skilled in the art may also understand that when a CPU core completes tasks by executing an instruction, due to an instruction length and an operating frequency, zero delay is impossible, and a delay is inevitable. In practice, the person skilled in the art may implement tasks as quickly as possible in combination with various methods in the prior art, and details are not described herein.

In the first aspect, when there is a data block in the decompression queue, the at least two cores in the second core group may obtain the data block in the decompression queue, and perform "parallel decompression" after obtaining a plurality of blocks, that is, the cores in the second core group do not decompress data blocks one after another, but perform parallel decompression. When parallel decompression is performed, decompression processes overlap in terms of time. For example, after a core obtains a data block at a first second, the core performs decompression at a second second to a 10th second. After a second core obtains a data block at the second second, the second core performs decompression at the third second to an 11th second. The decompression operations of the first core and the second core overlap in terms of time from the third second to the 10th second, that is, a "parallel decompression" effect exists.

In addition, it may be understood that, to increase the effect, during parallel decompression, each core in the second core group needs to obtain data from the decompression queue as quickly as possible, and performs decompression.

In the embodiment provided in the first aspect of the present disclosure, operations such as compressed image file obtaining, checking and calculation, and decompression are jointly completed by using a plurality of core groups (a plurality of cores). To speed up processing, a compressed kernel image file is divided into several data blocks. In this way, each time reading some data blocks, the first core group may perform check processing on the data blocks, and then put the checked data blocks into the decompression queue. Decompression processing does not need to be performed after all of the file is read and checked, so that reading/checking steps may be performed in parallel with a decompression step, thereby speeding up processing. In addition, when there is data in the decompression queue during decompression, the data is obtained by a plurality of cores and decompressed in parallel, so that the cores can obtain data blocks in a shortest time, and perform parallel decompression on the data blocks, to finally obtain the kernel image file, thereby further improving a processing speed, reducing a loading time, shortening a startup time of an entire device, and improving user experience.

Based on the first aspect, in a first implementation of the first aspect, the first core group includes a first core and a second core, and correspondingly, in the first aspect:

the obtaining, by the first core group, a plurality of data blocks in a compressed kernel image file from the nonvolatile storage includes: obtaining, by the first core, the plurality of data blocks in the compressed kernel image file from the nonvolatile storage; and the checking, by the first core group each time obtaining a data block, the currently obtained current data block includes: checking, by the second core each time obtaining a data block sent by the first core, the currently obtained current data block.

In the first implementation of the first aspect of the present disclosure, the first core group includes two cores, one core is configured to obtain a data block, and the other core is configured to perform a check. In this way, a data block obtaining action and a check action are also performed in parallel, thereby further improving a processing speed compared with a solution in which one core is configured to obtain a block and perform a check at the same time.

Based on the first implementation of the first aspect, in a second implementation of the first aspect, the first core and the second core are small cores. A large core is a core with a relatively high clock speed among all cores in the processor. In contrast, a small core is a core with a relatively low clock speed among all the cores in the processor. For example, in eight cores, four cores with a clock speed of 2.0 GHz are large cores, and the other four cores with a clock speed of 1.5 GHz are small cores.

In an application scenario of a multi-core processor, a core needs to obtain a data block from a nonvolatile storage. In this process, a main factor that affects a speed is a transmission rate of an interface between the core and the nonvolatile storage (that is, a bottleneck lies in the transmission rate of the interface), instead of a clock speed of each core. Therefore, even if a large core is chosen to perform the obtaining operation, an increased effect is extremely small. In the second implementation of the first aspect, choosing a small core to perform the operation may save large core resources for a subsequent scenario in which a large core computing capability really needs to be used (that is, a scenario in which a core with a high clock speed needs to be used to perform processing, for example, performing decompression), so that tasks of the cores are more effectively allocated, and an overall processing speed is further improved.

Based on the first aspect and the implementations of the first aspect, in a third implementation of the first aspect, the cores included in the second core group are large cores.

Because the cores are large cores, processing speeds of the cores are higher, thereby further improving a processing speed.

Based on the third implementation of the first aspect, in a fourth implementation of the first aspect, the large cores in the second core group include all large cores in the multi-core processor.

When the second core group includes all large cores, large core resources may be used to a maximum extent, so that all large cores perform decompression in parallel, and a processing speed is further improved.

Based on the third or the fourth implementation of the first aspect, in a fifth implementation of the first aspect, a length of each data block matches a speed of obtaining and checking a fragment by the first core group and a speed of performing decompression by a large core in the second core group, so that when there is or there will be kernel image file data in the decompression queue, at least two of the large cores in the second core group are not idle at the same time.

In this implementation, all the big cores can maintain operating in a full load mode before decompression tasks are completed, so as to use large core resources to a maximum extent, and further improve a processing speed.

Based on the first aspect and the implementations of the first aspect, in a sixth implementation of the first aspect, the compressed kernel image file further includes a checksum of each of the data blocks; and the checking, by the first core group each time obtaining a data block, the currently obtained current data block includes: checking the current data block according to a checksum of the current data block.

In this implementation, a checksum of each data block is a checksum obtained by performing checksum calculation on the data block, and one data block is corresponding to one checksum. The check and calculation may use various existing algorithms, and a cyclic redundancy check (CRC) is a typical example. The first core group mainly checks the data block to determine whether an error occurs on the received data. If the check fails, an error occurs. Error processing needs to be performed (for example, terminating a loading procedure or giving alarm information). A check is implemented in this implementation and the implementation is simple, thereby reducing development costs.

Based on the sixth implementation of the first aspect, in a seventh implementation of the first aspect, the compressed kernel image file further includes a total checksum, the total checksum is obtained by calculating a checksum of the checksums of all the data blocks, and the method further includes:

after completing a check of a last data block, calculating, by the first core group, the checksum of the checksums of all the data blocks, determining whether the checksum is consistent with the total checksum, and if the checksum is inconsistent with the total checksum, performing error processing.

In this implementation, rechecking is performed. That is, checksum calculation is additionally performed on the checksums of the blocks. In this way, a check capability may be further enhanced (for example, a block loss may occur. In this case, checksums of blocks that are not lost may be correct, and a lost block cannot be checked. However, if a check is performed by using a total checksum, an error can be found). In addition, checksum calculation is not performed on all data, only the checksums are checked, thereby reducing a workload and improving a processing speed.

The compressed kernel image file further includes a decompression address of each data block, and the decompression address is used to indicate a physical address that is in the memory and into which the data block is decompressed, and correspondingly, the obtaining, by at least two of the plurality of cores in the second core group when there is a data block in the decompression queue, a plurality of data blocks in the decompression queue, and decompressing the plurality of obtained data blocks into the memory in parallel to obtain the kernel image file includes:

obtaining, by the at least two of the plurality of cores in the second core group when there is a data block in the decompression queue, a plurality of data blocks in the decompression queue, and decompressing the plurality of obtained data blocks into the memory in parallel according to decompression addresses of the plurality of data blocks to obtain the kernel image file.

In this implementation, each block is further corresponding to one decompression address, and a core used for decompression can store a block in a corresponding location according to a decompression address by using the decompression address, so as to finally decompress the compressed kernel image file all into the memory. In addition, the implementation is simple, and development costs are reduced.

In another implementation of the first aspect, after a core in the first core group completes its own task, the core may also be used as a core in the second core to obtain data from the decompression queue for decompression, so as to improve a quantity of cores performing decompression operations in parallel, and improve a processing speed.

In another implementation of the first aspect, when a small core is used for decompression in the second core group, the small core finds that there is data in the decompression queue, and first waits a first time (for example, 10 instruction cycles) to determine whether there is an idle large core within the time period. If there is an idle large core within the time period, the large core preferably processes data in the decompression queue. When both a large core and a small core are used for processing, the small core may become idle ahead of the large core, so as to obtain data in the decompression queue first, but the large core may also become idle within an extremely short instruction cycle (for example, within 10 instruction cycles). In this case, if the small core first performs processing without the use of a large core resource (it may take a relatively long time before the large core can perform processing), a processing speed is reduced. In this manner, even if the small core can obtain data, the small core does not immediately obtain the data. It takes a relatively small time for the small core to wait and see whether an idle large core appears within the time period. If the idle large core appears within the time period, the large core preferably performs processing, thereby improving a processing speed.

In another implementation of the first aspect, based on the first aspect and various implementations, a kernel image may be further booted, that is, after decompression is completed, a kernel is booted by a boot core based on a decompressed kernel image file. The boot core may be a core that is in the multi-core processor and that is specified to complete a bootstrap function. A device may be started by using a boot kernel.

Based on the first aspect and the implementations of the first aspect, in a second aspect, an embodiment of the present disclosure discloses a multi-core processor, including a first core group and a second core group, where the first core group and the second core group are configured to perform the various methods in the first aspect and various implementations of the first aspect.

Based on the foregoing aspects and various implementations of the aspects, in a third aspect, an embodiment of the present disclosure discloses an electronic device, including a nonvolatile storage, a memory, and the multi-core processor in the second aspect and various implementations of the second aspect.

Based on the foregoing aspects and various implementations of the aspects, in a fourth aspect, an embodiment of the present disclosure discloses a readable storage medium, configured to store code that is performed when the multi-core processor mentioned in the foregoing aspects performs an operation. This code may be code of a boot program.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
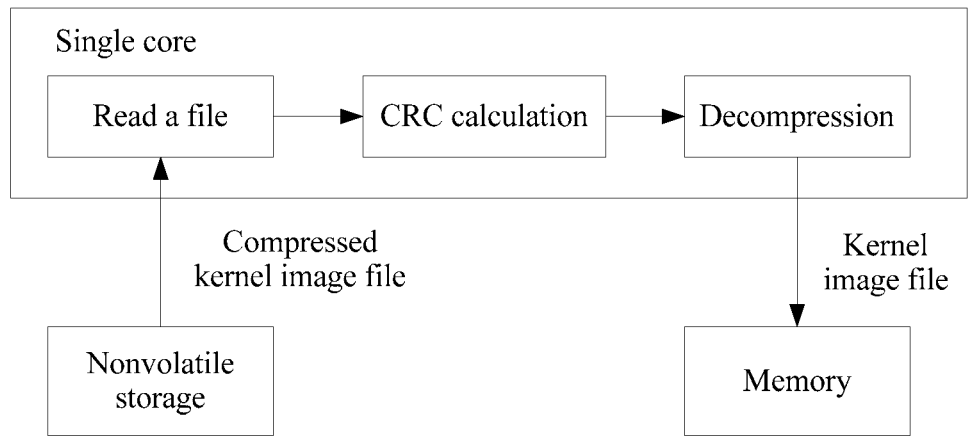
FIG. 1 is a schematic diagram of a method for obtaining a kernel image file according to the prior art.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the objectives, technical solutions, and advantages of the present disclosure clearer and more comprehensible, the following further describes the present disclosure in detail with reference to the specific embodiments and accompanying drawings.

In an embodiment, an electronic device usually includes: a multi-core processor, a memory, a nonvolatile storage, an input/output device, and the like.

In this embodiment, the multi-core processor is a system on chip (System on Chip, SoC) that includes a plurality of functional modules. In addition to a plurality of processor cores, the multi-core processor includes a plurality of modules such as a graphics processing unit (Graphics Processing Unit, GPU), a baseband processing module, an image processor (Image Signal Processor, ISP), a digital signal processor (Digital Signal Processor, DSP), and a peripheral interface. These modules are encapsulated into a chip and are connected to the memory, the nonvolatile storage, and the input/output device by using corresponding interfaces. A specific interface type and a specific connection manner are technologies well known to a person skilled in the art, and details are not described in this embodiment.

In this embodiment, implementation of the memory, the nonvolatile storage, and the input/output device may be the same as that in the prior art. For example, the nonvolatile storage may be a storage medium such as a disk or a flash memory. The input device may include devices such as a mouse, a touchscreen, and a keyboard, and the output device includes a display, and the like. It should be noted that, for ease of description, in the following, the "nonvolatile storage" is also referred to as a "storage" for short. Unless otherwise specified, the "storage" in the following indicates the "nonvolatile storage".

In this embodiment, the processor includes eight processor cores (referred to as "cores" below). The cores include four large cores and four small cores. For ease of description, the four large cores are respectively named a large core A, a large core B, a large core C, and a large core D. The four small cores are respectively named a small core A, a small core B, a small core C, and a small core D.

Based on an architecture of the multi-core processor system and a kernel of the multi-core processor, before the multi-core processor loads an image, the multi-core processor first needs to perform step S0.

S0. Before powered on, the multi-core processor first performs block compression on a kernel image file (referred to as a "kernel image" or an "image" below), and then stores the compressed kernel image file in the nonvolatile storage (referred to as a "storage" below). This step is usually implemented by a manufacturer before delivery of a device.

In this embodiment, to reduce a volume of a kernel image, after block compression is performed on the kernel image, the compressed kernel image is stored in the storage. For ease of description, in this embodiment, a compressed kernel image file is referred to as a "compressed image".

Figure 2:
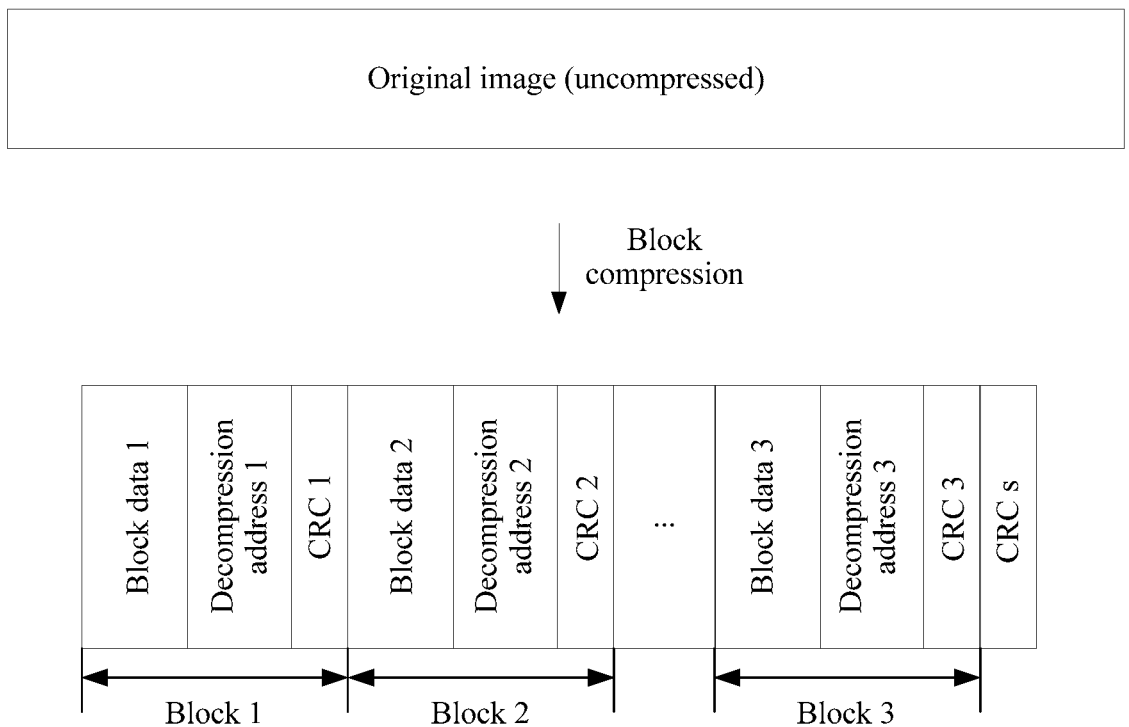
FIG. 2 is a schematic diagram of performing block compression on an original image according to Embodiment 1 of the present disclosure.

Referring to FIG. 2, FIG. 2 is a schematic structural diagram of a compressed image obtained by performing block compression on an original kernel image file, adding a checksum (for example, a CRC checksum), adding a decompression address, and adding a total checksum. The compressed image includes a plurality of data blocks (referred to as blocks below). Each block includes block data of the block, a decompression address of each block, and a checksum of each block (represented by a CRC 1 to a CRC n in the figure, where a checksum of each block is obtained by using a physical address and block data in the block). In addition, the compressed file includes a total checksum (represented by a CRC s in FIG. 2). The block data, the decompression address, the checksum of each block, and the total checksum are set according to an agreed-upon length and sequence (as shown in FIG. 2, block data 1 is located in the forefront of the compressed file, and the CRC s is located at the end).

A data block is a part of data obtained after data of the original kernel image file is compressed (referred to as a "block"), and a size of the block may be configured at a compression phase. For example, in this embodiment, a size of each block is 200 KB.

A specific size of the block is not limited, and may be configured at the compression phase. The block should not be too small or too large, and may be roughly determined by using the following formula:

Block size=Size of a compressed image/Quantity of decompression cores/Quantity of blocks that can be decompressed by each core on average In the foregoing formula, the quantity of decompression cores is a quantity of cores performing decompression. For example, for an 8-core processor, four cores (mainly four large cores) perform decompression for most of the time. Therefore, for the 8-core processor, a quantity of decompression cores may be usually set to 4 to 8.

In the foregoing formula, the quantity of blocks that can be decompressed by each core on average may be usually set to 10 to 20. If the block size is too large, an excessively small quantity of blocks need to be decompressed by cores. In this case, after performing decompression, some cores become idle and wait, and core resources are not used to a greater extent. If the block size is too small, an excessively large quantity of blocks need to be decompressed by cores. In this case, each time a block is processed, some additional overheads unrelated to decompression (for example, reading data) increase, thereby reducing processing efficiency.

It should be noted that the foregoing formula can produce merely a relatively appropriate empirical value, and in practice, an optimal block size for various multi-core processors and for compressed images of various sizes may be constantly verified in combination with an experimental means.

In this embodiment, the decompression address is a physical address in a memory after final decompression, that is, some addresses are reserved in the memory for storing a decompressed kernel image file. Decompressed addresses may be consecutively numbered. For example, physical address space [100 KB, 200 KB) of the memory may be allocated to a block 1, and physical address space [200 KB, 300 KB] may be allocated to a block 2, and so on.

In this embodiment, a CRC checksum (for example, the CRC 1 and the CRC n) of each block is a value obtained after a CRC operation is performed on each data block and a decompression address.

In this embodiment, a total CRC (the CRC s in FIG. 2) is a value obtained after a CRC operation is performed on the CRC checksums of all the blocks (which may be simply indicated by a formula: CRC s=CRC 1+CRC 2+ . . . +CRC n), and the total CRC is located at the end of the entire compressed image.

Figure 3:
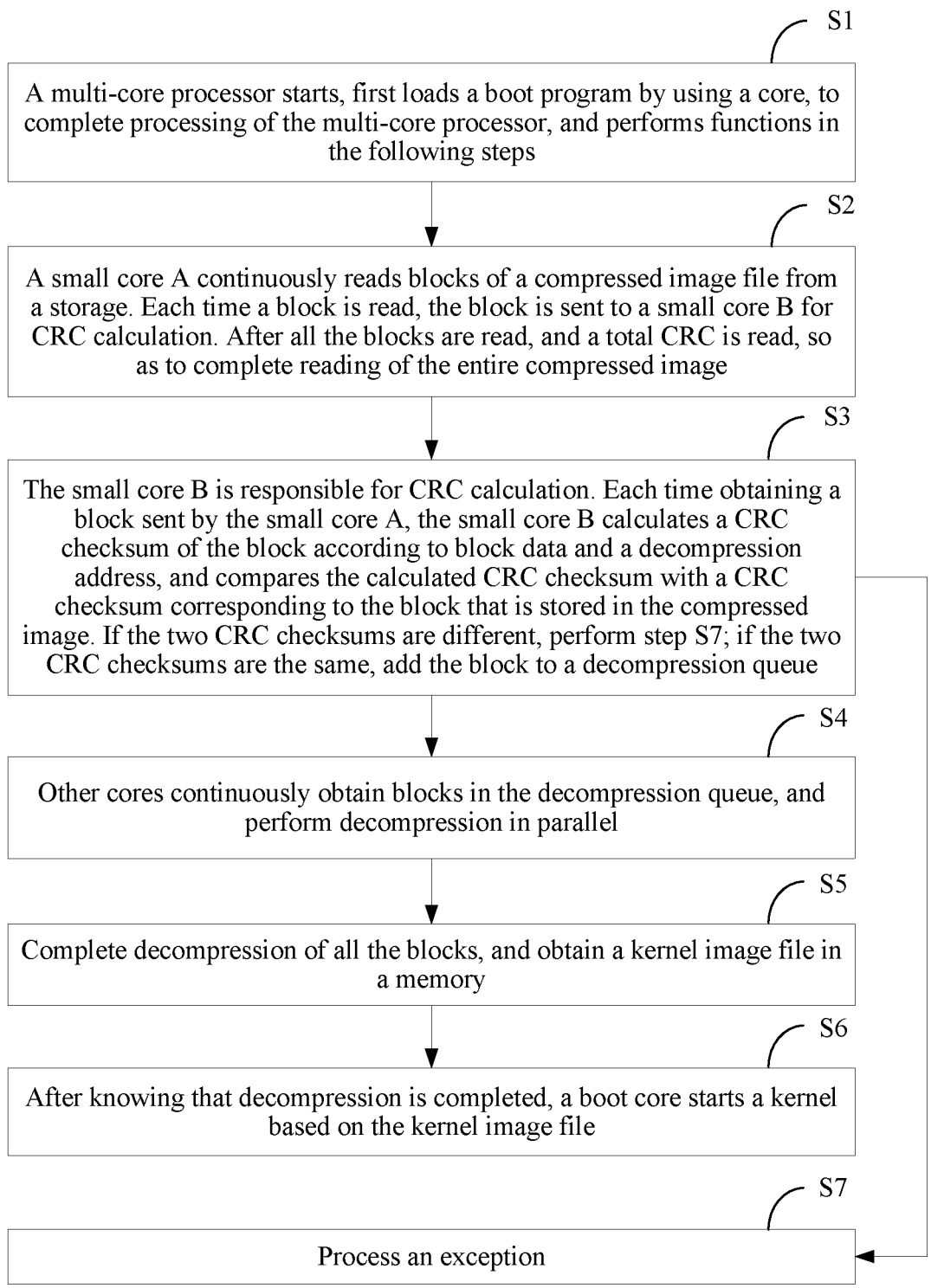
FIG. 3 is a flowchart of a method for loading a kernel image file according to Embodiment 1 of the present disclosure.
Figure 4:
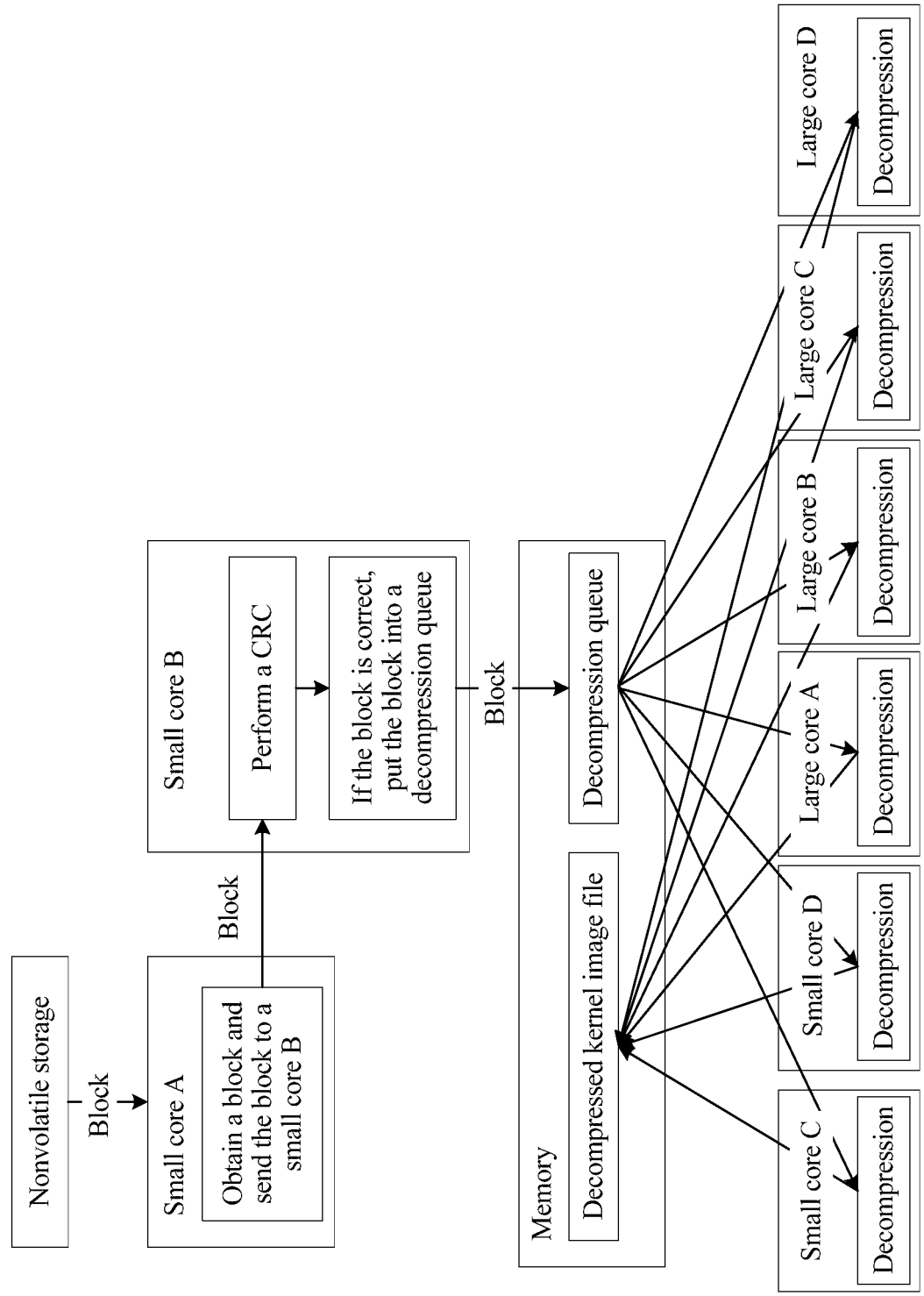
FIG. 4 is a schematic diagram of a method for loading a kernel image file according to Embodiment 1 of the present disclosure.

Referring to a flowchart in FIG. 3 and a schematic diagram in FIG. 4, in this embodiment, a method for loading a kernel image file into a memory by a multi-core processor includes the following steps. It should be noted that sequence numbers of the following steps do not indicate a strict execution sequence, and a person skilled in the art may know an execution sequence of all the steps according to content in the steps.

S1. The multi-core processor starts, first loads a boot program by using a core, to complete processing of the multi-core processor, and performs functions in the following steps.

The boot program is a program that is used to boot an operating system. A main function of the boot program includes loading an image from a storage into the memory, and starting a kernel based on the image loaded in the memory.

The core may be any specified core, and is usually referred to as a "boot core". Usually, the core is denoted as a core 0, and is usually a small core.

S2. A small core A continuously reads blocks of a compressed image file from a storage. Each time a block is read, the block is sent to a small core B for CRC calculation. After all the blocks are read, and a total CRC is read, so as to complete reading of the entire compressed image.

During reading, each block, a decompression address of each block, a checksum of each block, a total checksum, and the like may be successively read by reading data of a fixed length at a time. Specifically, the small core A puts data in a cache receiving queue, and the small core B obtains data from the cache receiving queue.

If reading is completed (including completion of reading the total CRC), the small core A notifies the small core B that reading of the compressed image has been completed. After receiving the notification, the small core B knows that other tasks may be performed subsequently provided that all data in the cache receiving queue is processed. If an error occurs in the reading process, perform step S7.

S3. The small core B is responsible for CRC calculation. Each time obtaining a block sent by the small core A, the small core B calculates a CRC checksum of the block (such as a data block 1 in FIG. 2) according to block data and a decompression address in the block, and compares the calculated CRC checksum with a CRC checksum corresponding to the block that is stored in the compressed image (such as a CRC 1 in FIG. 2). If the two CRC checksums are different, perform step S7; if the two CRC checksums are the same, add the block to a decompression queue.

In terms of hardware, the decompression queue is located in an area in the memory, and in terms of software, the decompression queue is managed by a boot program. A size of the decompression queue may be determined according to a rate of putting a block into the decompression queue and a decompression rate of each core, provided that the size may prevent a case in which the queue overflows because blocks are not read in time, and the queue does not occupy much memory.

In this embodiment, to calculate a total CRC checksum, after CRC checksums of blocks are calculated in this step, the CRC checksums of the blocks are added together to a variable used to calculate the total CRC checksum, as shown in the following formula:

total_CRC=total_CRC+CRC[i], where total_CRC is a variable, and an initial value of total_CRC is 0; total_CRC on the left of the equation indicates a currently updated (that is, latest) total CRC checksum, total_CRC on the right of the equation indicates an old total CRC checksum (that is, a total CRC checksum used before this update); and CRC[i] indicates a CRC checksum of each block, and i may be a natural number (such as 0, 1, 2, . . . ). By using the foregoing calculation formula, each time a CRC checksum of each block is calculated, the variable total_CRC is added to the CRC checksum of the block together. In this way, when a CRC checksum of a last block is determined, a value of total_CRC (that is, the total CRC checksum) is also determined.

If the small core B receives the notification that is sent by the small core A and that is used to indicate that "reading of the image has been completed", after the calculation of the total CRC checksum is completed, the small core B determines whether the total CRC checksum is the same as a total CRC checksum in the compressed image. If the two total CRC checksums are different, perform step S7. If the two total CRC checksums are the same, a core used for decompression knows, in a manner, that a total CRC check is completed (that is, reading and a check of all data are completed). The specific manner may be giving a notification by using an interrupt, or setting a special flag at the end of the decompression queue. When the core used for decompression reads the special flag, the core knows that reading and a check of all parts have been completed, so that the queue no longer needs to be read from the queue to perform a decompression operation.

S4. Other cores continuously obtain blocks in the decompression queue, and perform decompression in parallel.

Figure 5:
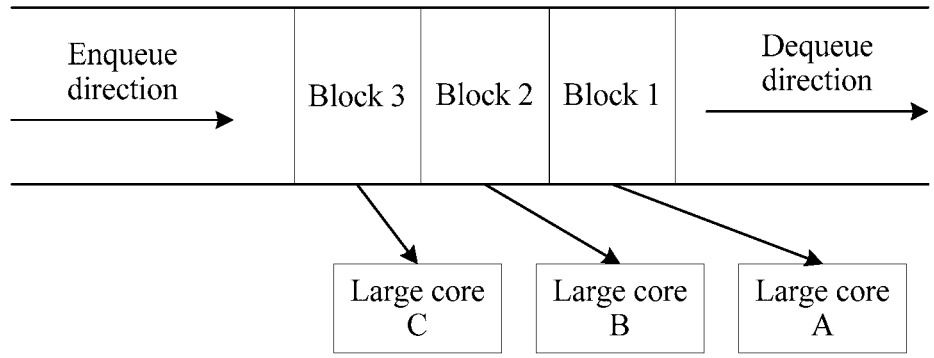
FIG. 5 is a schematic diagram of obtaining a block from a decompression queue by each core according to Embodiment 1 of the present disclosure.

In this embodiment, large cores other than the small core A and the small core B actively continuously query, at intervals as small as possible, whether the decompression queue is empty. If there is data in the decompression queue, a data block is read from the decompression queue to be decompressed, so that block data of the block is written into a memory address indicated by a decompression address in the block. If a decompression error occurs, perform step S7. If the decompression queue is empty, new to-be-decompressed data in the decompression queue continues to be waited for. For example, referring to FIG. 5, FIG. 5 is a schematic diagram of obtaining a block from a decompression queue by a large core. When there is a block 1 in the decompression queue, the large core A obtains and processes the block 1. When there is a block 2 in the queue, the large core B processes the block 2. Then, when there is a block 3 in the queue, the large core C processes the block 3.

When a core used for decompression obtains a block image from the decompression queue, a lock flag is set for the block, that is, a flag is set in the decompression queue in the memory, to prevent another core from obtaining the block image. If decompression is completed, the block image is deleted from the queue.

S5. Complete decompression of all the blocks, and obtain a kernel image file in the memory.

S6. After knowing that decompression is completed, a boot core starts a kernel based on the kernel image file.

The boot core may detect a completion flag bit in a progress table to determine whether decompression of all the blocks is completed. Each flag bit in this progress table corresponds to one data block. Each time a data block is processed, a core that processes the block sets a corresponding flag bit in the progress table to a specific value (such as 0 or 1). When the boot core detects that all flag bits become specific values, it indicates that decompression of all blocks is completed.

S7. Process an exception.

If an error or exception occurs, the error or exception may be processed by means of restarting or an alarm. Details are not described herein.

Embodiment 2

Figure 6:
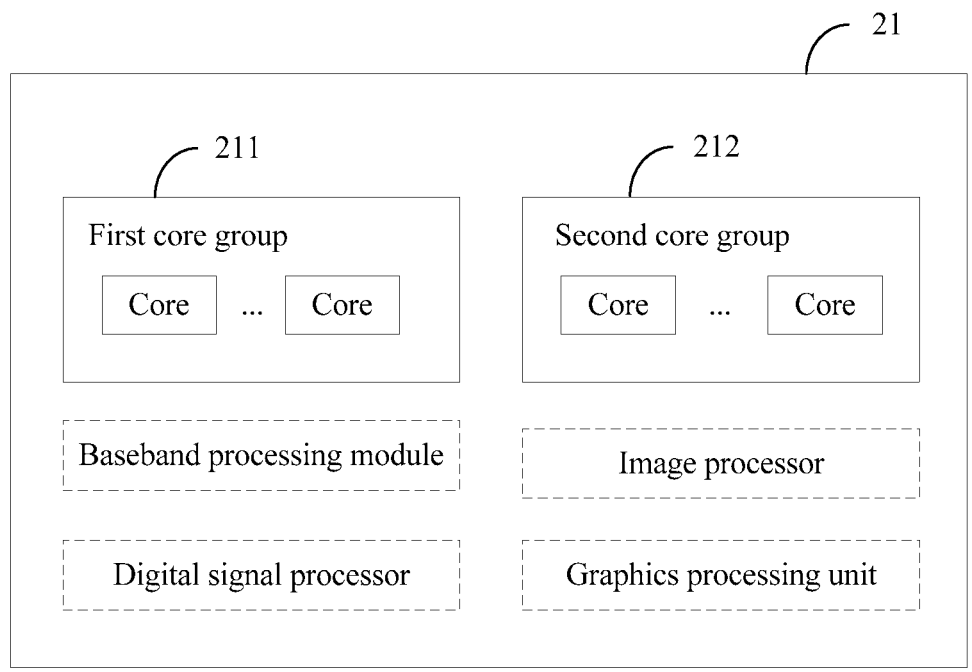
FIG. 6 is a schematic structural diagram of a multi-core processor according to Embodiment 2 of the present disclosure.

Referring to FIG. 6, based on Embodiment 1, an embodiment discloses a multi-core processor 21, including a first core group 211 and a second core group 212. The first core group and the second core group each include at least one core, and are configured to perform the functions in the foregoing embodiments. For example, a core in the first core group may be configured to complete a function of reading a compressed kernel image file from a nonvolatile storage and a check function, and a core in the second core group may be configured to complete a decompression function.

Embodiment 3

Figure 7:
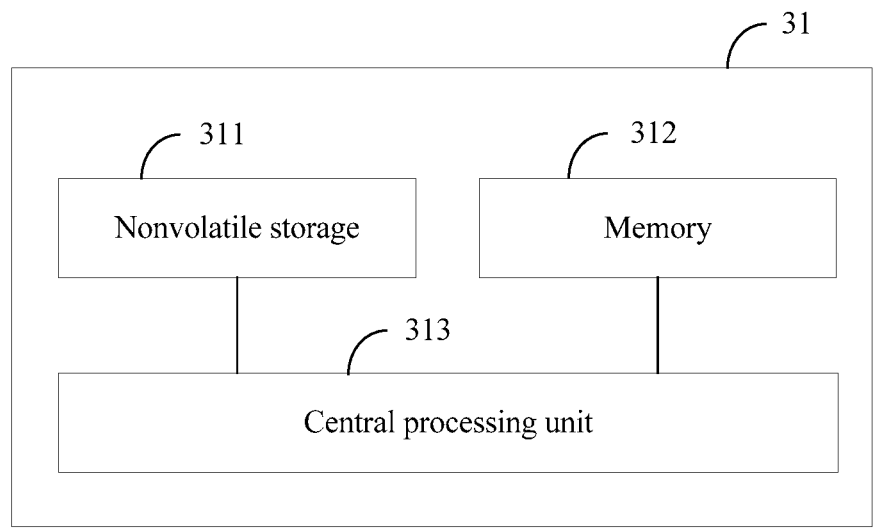
FIG. 7 is a schematic structural diagram of an electronic device according to Embodiment 3 of the present disclosure.

Referring to FIG. 7, based on the foregoing embodiments, an embodiment of the present disclosure discloses an electronic device 31, including a nonvolatile storage 311, a memory 312, and a multi-core processor 313 in Embodiment 2. Connections and communication between the multi-core processor, the nonvolatile storage, and the memory all belong to the prior art, and details are not described in this embodiment.

Embodiment 4

Figure 8:
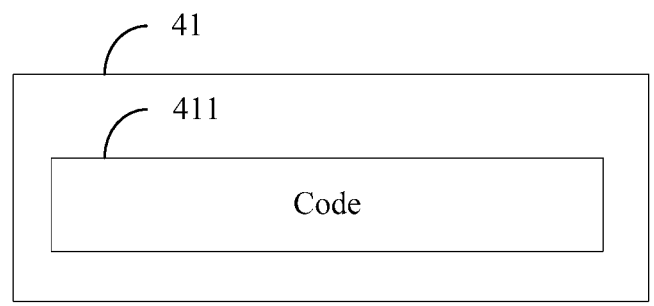
FIG. 8 is a schematic structural diagram of a readable storage medium according to Embodiment 4 of the present disclosure.

Referring to FIG. 8, based on the foregoing embodiments, an embodiment of the present disclosure discloses a readable storage medium 41, configured to store code that is used when the multi-core processor in the foregoing embodiments performs an operation. This code may be code 411 of a boot program. The storage medium may be a nonvolatile storage medium, for example, an optical disc, a flash memory (flash), or a disk.

In the foregoing example embodiments, the objectives, technical solutions, and advantages of the present disclosure are further described in detail. It should be understood that the foregoing descriptions are merely example embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A method for fast loading a kernel image file, wherein the method is executed by a multi-core processor, wherein the multi-core processor is connected to a nonvolatile storage and a memory, wherein the multi-core processor comprises a first core group and a second core group, wherein the first core group comprises at least one core, wherein the second core group comprises a plurality of cores, and wherein the method comprises:

obtaining, by the first core group, a plurality of data blocks in a compressed kernel image file from the nonvolatile storage, wherein the compressed kernel image file comprises a plurality of data blocks obtained after block compression is performed on the kernel image file;

checking, by the first core group each time obtaining a data block, the currently obtained current data block;

in response to determining that the current data block is correct, putting, by the first core group, the current data block into a decompression queue;

obtaining, by at least two of the plurality of cores in the second core group when there is a data block in the decompression queue, the data block in the decompression queue; and in response to obtaining a plurality of data blocks, decompressing the plurality of obtained data blocks in parallel into the memory to finally obtain the kernel image file, wherein a length of each data block matches a speed of obtaining and checking a data block by the first core group and a speed of performing decompression by a core in the second core group.

2. The method according to claim 1, wherein the first core group comprises a first core and a second core, and wherein the obtaining, by the first core group, a plurality of data blocks in a compressed kernel image file from the nonvolatile storage comprises obtaining, by the first core, the plurality of data blocks in the compressed kernel image file from the nonvolatile storage; and wherein the checking, by the first core group each time obtaining a data block, the currently obtained current data block comprises checking, by the second core each time obtaining a data block sent by the first core, the currently obtained current data block.

3. The method according to claim 2, wherein the first core and the second core are small cores.

4. The method according to claim 1, wherein the cores comprised in the second core group are large cores.

5. The method according to claim 4, wherein the large cores in the second core group comprise all large cores in the multi-core processor.

6. The method according to claim 4, wherein when the length of each data block matches the speed of obtaining and checking the data block by the first core group and the speed of performing decompression by the core in the second core group, then when there is or there will be a data block in the decompression queue, at least two of the large cores in the second core group are not idle at the same time.

7. The method according to claim 1, wherein the compressed kernel image file further comprises a checksum of each of the data blocks; and wherein the checking, by the first core group each time obtaining a data block, the currently obtained current data block comprises checking the current data block according to a checksum of the current data block.

8. The method according to claim 7, wherein the compressed kernel image file further comprises a total checksum, wherein a total check bit is obtained by calculating a checksum of the checksums of all the data blocks, and wherein the method further comprises:

in response to completing a check of a last data block, calculating, by the first core group, the checksum of the checksums of all the data blocks;

determining whether the checksum is consistent with the total checksum; and in response to determining that the checksum is inconsistent with the total checksum, performing error processing.

9. The method according to claim 1, wherein the obtaining, by at least two of the plurality of cores in the second core group when there is a data block in the decompression queue, the data block in the decompression queue, and decompressing a plurality of obtained data blocks into the memory in parallel to obtain the kernel image file comprises:

obtaining, by the at least two of the plurality of cores in the second core group and when there is a data block in the decompression queue, the data block in the decompression queue; and decompressing data blocks into the memory in parallel according to decompression addresses of the data blocks to obtain the kernel image file.

10. A multi-core processor, comprising a first core group and a second core group, wherein the first core group comprises at least one core, and wherein the second core group comprises a plurality of cores;
  wherein the first core group is configured to obtain a plurality of data blocks in a compressed kernel image file from a nonvolatile storage connected to the multi-core processor, wherein the compressed kernel image file comprises a plurality of data blocks obtained after block compression is performed on the kernel image file;
  wherein the first core group is further configured to:
    in response to obtaining a data block, check the currently obtained current data block; and
    in response to determining that the current data block is correct, put the current data block into a decompression queue; and
  wherein at least two of the plurality of cores in the second core group are configured to:
    in response to determining that there is a data block in the decompression queue, obtain the data block in the decompression queue; and
    in response to obtaining a plurality of data blocks, decompress the plurality of obtained data blocks in parallel into a memory connected to the multi-core processor, to finally obtain the kernel image file,
  wherein a length of each data block matches a speed of obtaining and checking a fragment by the first core group and a speed of performing decompression by a core in the second core group.

11. The multi-core processor according to claim 10, wherein the first core group comprises a first core and a second core, and wherein that the first core group is configured to obtain a plurality of data blocks in a compressed kernel image file from a nonvolatile storage connected to the multi-core processor comprises:
  the first core obtains the plurality of data blocks in the compressed kernel image file from the nonvolatile storage; and
  wherein that the first core group is configured to: in response to obtaining a data block, check the currently obtained current data block comprises:
  the second core is configured to: in response to obtaining a data block sent by the first core, check the currently obtained current data block.

12. The multi-core processor according to claim 11, wherein
  the first core and the second core are small cores.

13. The multi-core processor according to claim 10, wherein
  the cores comprised in the second core group are large cores.

14. The multi-core processor according to claim 13, wherein
  the large cores in the second core group comprise all large cores in the multi-core processor.

15. The multi-core processor according to claim 13, wherein
  when the length of each data block matches the speed of obtaining and checking the fragment by the first core group and the speed of performing decompression by the core in the second core group, then when there is or there will be kernel image file data in the decompression queue, at least two of the large cores in the second core group are not idle at the same time.

16. The multi-core processor according to claim 10, wherein
  the compressed kernel image file further comprises a checksum of each of the data blocks; and
  wherein that the first core group is configured to: in response to obtaining a data block, check the currently obtained current data block comprises:
    the first core group is configured to check the current data block according to a checksum of the current data block.

17. The multi-core processor according to claim 16, wherein
  the compressed kernel image file further comprises a total checksum, wherein a total check bit is obtained by calculating a checksum of check bits of all the data blocks, and wherein the first core group is further configured to:
    after the first core group completes a check of a last data block, calculate the checksum of the checksums of all the data blocks;
    determine whether the checksum is consistent with the total checksum; and
    in response to determining that the checksum is inconsistent with the total checksum, perform error processing.

18. The multi-core processor according to claim 10, wherein
  the compressed kernel image file further comprises a decompression address of each data block, and wherein the decompression address is used to indicate a physical address that is in the memory and into which the data block is decompressed, and wherein that the at least two of the plurality of cores in the second core group are configured to: when there is a data block in the decompression queue, obtain the block in the decompression queue, and decompress blocks into the memory in parallel to obtain the kernel image file comprises:
    the at least two of the plurality of cores in the second core group are configured to: when kernel image file data of a data block exists in the decompression queue, obtain the block in the decompression queue and decompress blocks into the memory in parallel according to decompression addresses of the blocks to obtain the kernel image file.

19. An electronic device, comprising a nonvolatile storage, a memory, and a multi-core processor, wherein the multi-core processor comprises a first core group and a second core group, wherein the first core group comprises at least one core, and wherein the second core group comprises a plurality of cores;
  wherein the first core group is configured to obtain a plurality of data blocks in a compressed kernel image file from a nonvolatile storage connected to the multi-core processor, wherein the compressed kernel image file comprises a plurality of data blocks obtained after block compression is performed on the kernel image file;
  wherein the first core group is further configured to:
    in response to obtaining a data block, check the currently obtained current data block; and
    in response to determining that the current data block is correct, put the current data block into a decompression queue; and
  wherein at least two of the plurality of cores in the second core group are configured to:
    in response to determining that there is a data block in the decompression queue, obtain the data block in the decompression queue; and in response to obtaining a plurality of data blocks, decompress the plurality of obtained data blocks in parallel into the memory connected to the multi-core processor, to finally obtain the kernel image file, wherein a length of each data block matches a speed of obtaining and checking a data block by the first core group and a speed of performing decompression by a core in the second core group.

\* \* \* \* \*